April 20, 1943.                W. B. MITCHELL                2,316,969
                          GLASS SHAPING MACHINE
                          Filed June 29, 1939                8 Sheets-Sheet 1
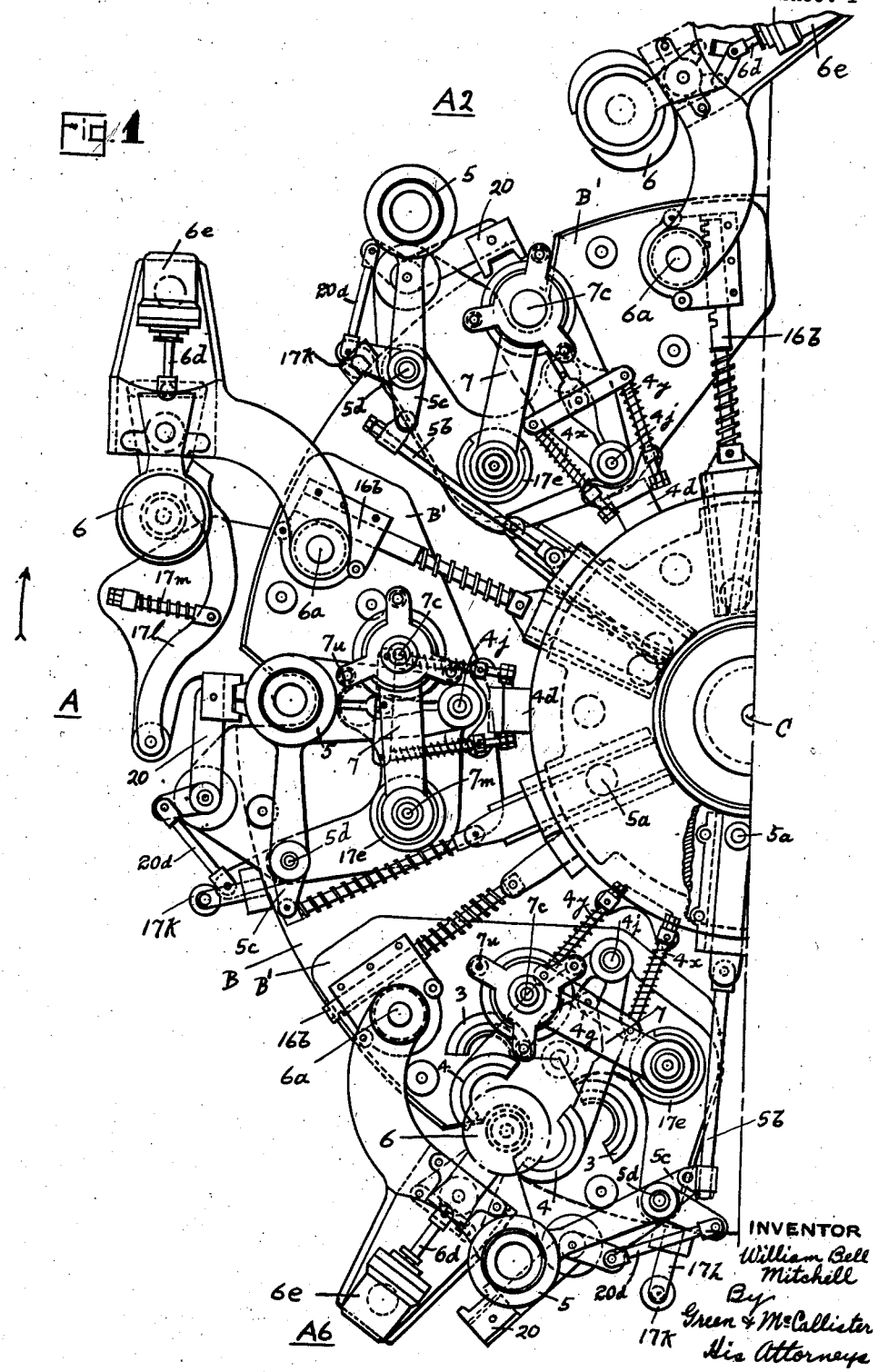

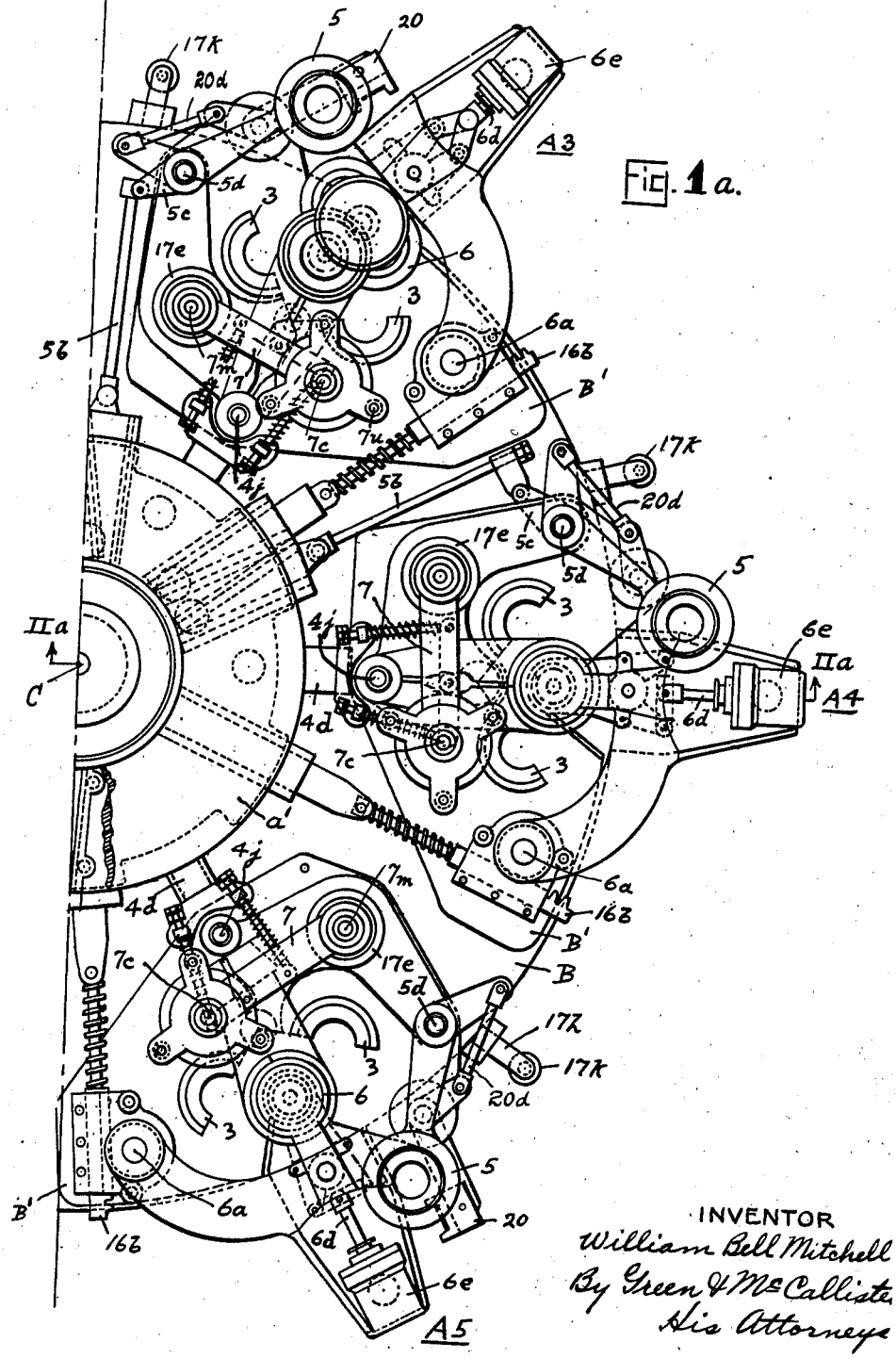

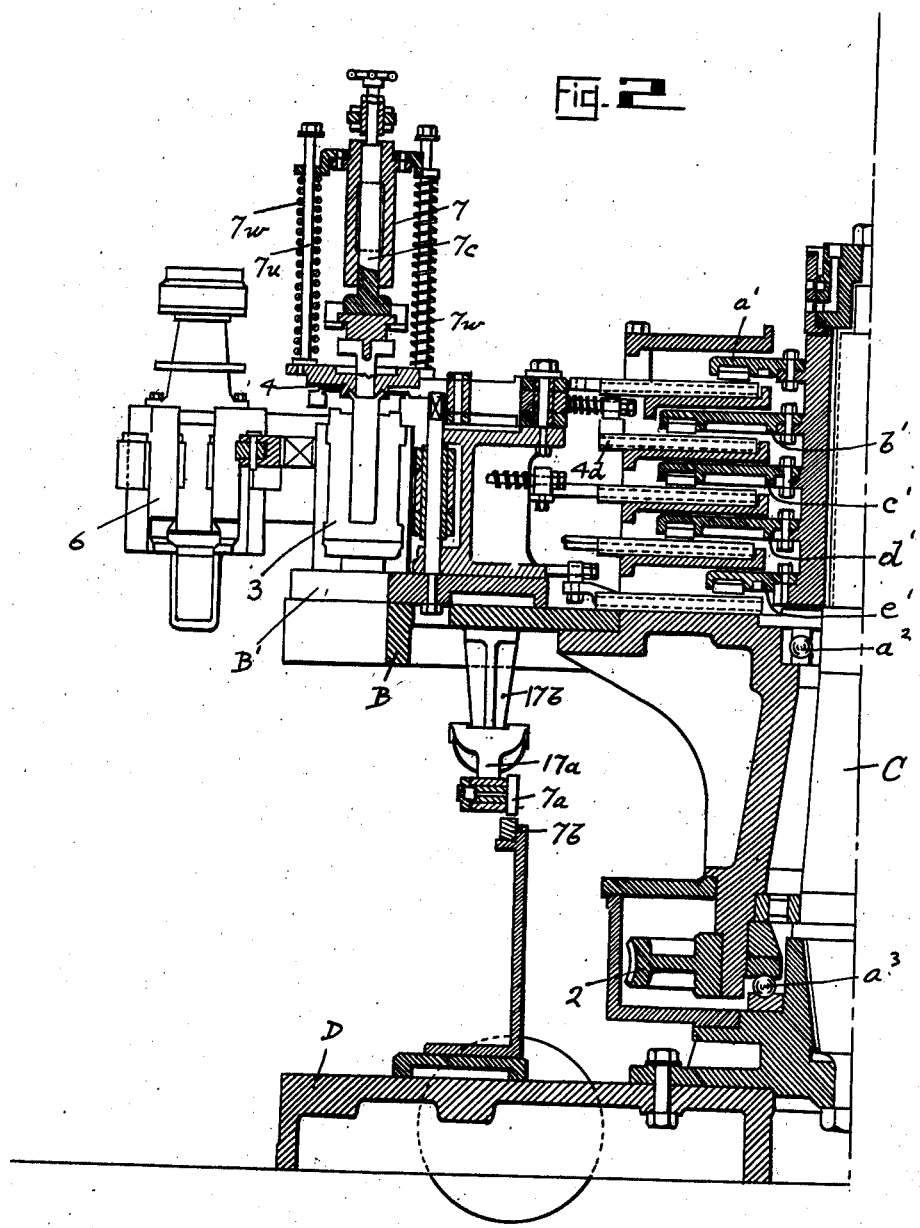

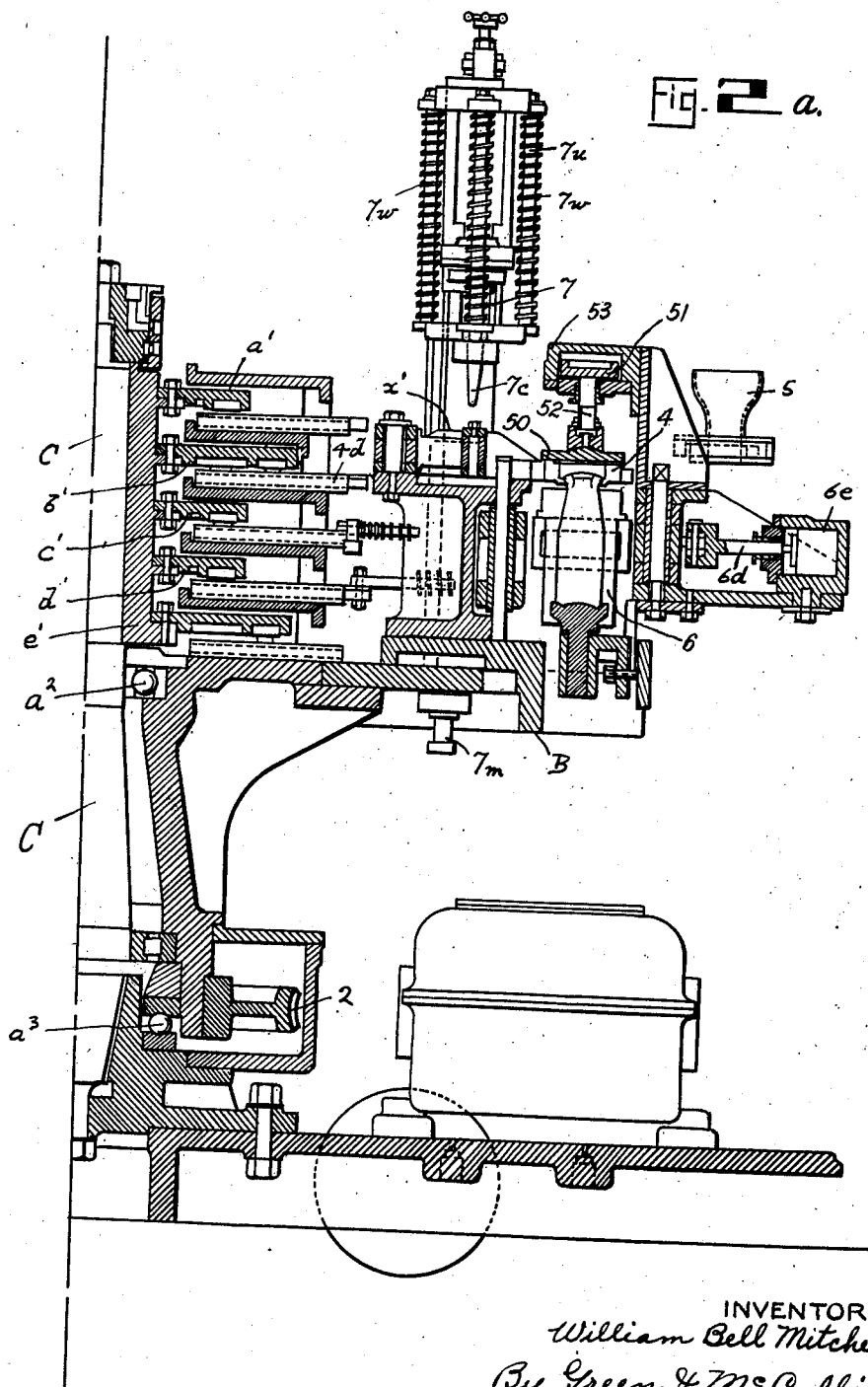

April 20, 1943.　　　W. B. MITCHELL　　　2,316,969
GLASS SHAPING MACHINE
Filed June 29, 1939　　　8 Sheets-Sheet 5

INVENTOR
William Bell Mitchell
By Green & McCallister
His Attorneys

April 20, 1943. W. B. MITCHELL 2,316,969
GLASS SHAPING MACHINE
Filed June 29, 1939 8 Sheets-Sheet 7

INVENTOR
William Bell Mitchell
By Green & McCallister
His Attorneys

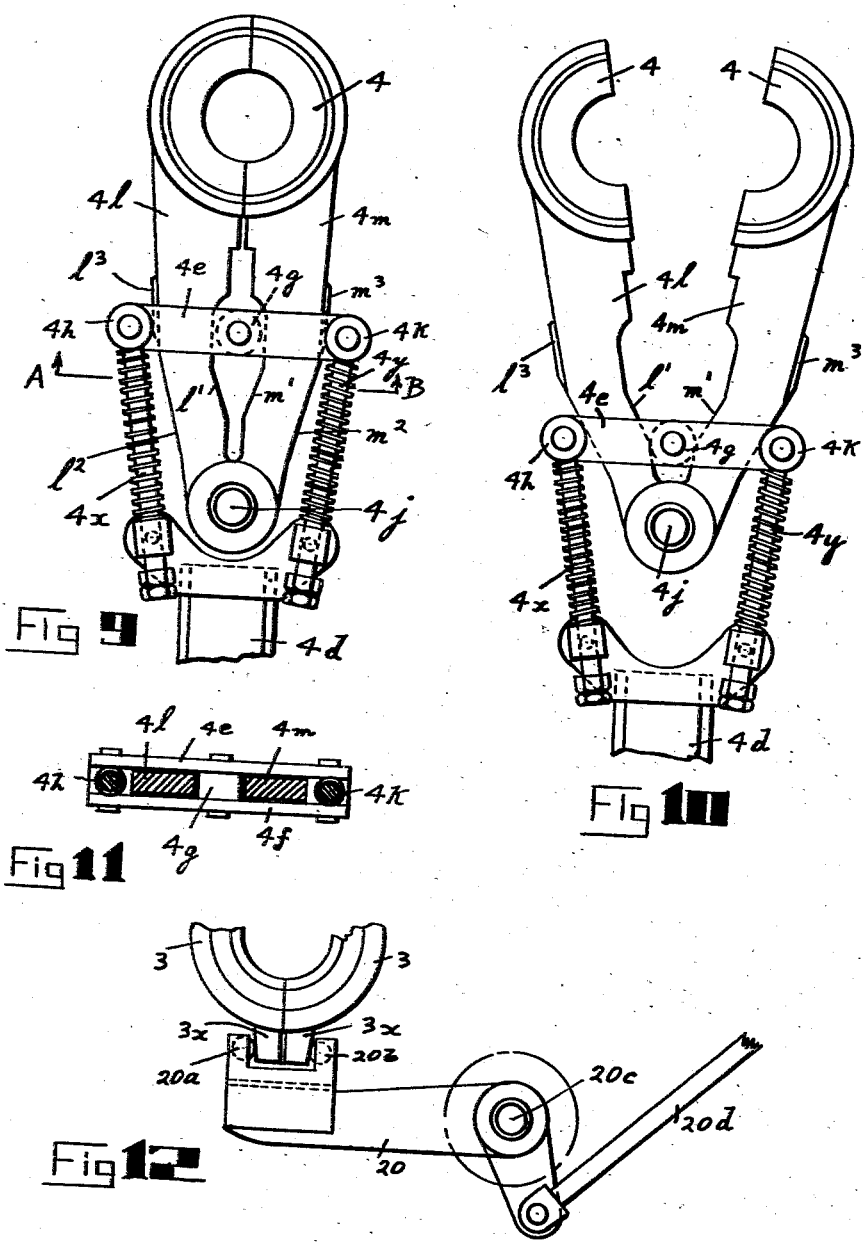

Patented Apr. 20, 1943

2,316,969

UNITED STATES PATENT OFFICE 2,316,969

GLASS SHAPING MACHINE

William Bell Mitchell, Bradford, England, assignor to The Mitchell Glass Company Limited, Bradford, England Application June 29, 1939, Serial No. 281,810
In Great Britain June 30, 1938

13 Claims. (Cl. 49—5)

This invention relates to glass shaping machines of the press and blow type used in the manufacture of bottles or other containers in an automatic and continuous manner.

In this type of machine the blank or parison moulds pass successively beneath a flow feeder which feeds a predetermined charge or gob of glass in each mould, after which the charge is first acted upon by a pressing member and then, after transference to a blowing or finishing mould, is acted upon by air under pressure to form the desired shape of bottle or other container.

The object of my present invention is so to construct and operate the machine that the charge when received is not removed from the circle which it occupies until it is completely formed into the finished article.

According to the present invention a machine of the type to which I have said this invention relates comprises means wherein the charge of glass is received into a parison and neck ring mould and is pressed therein, after which the parison mould is removed and replaced by a finishing mould, the arrangement being such that the glass, after it has been received in the parison mould until it has been completely formed in the finishing mould, moves bodily through a circular path or arcuate path of constant radius.

In order that my invention may be more readily understood, I hereto append sheets of drawings, in which:

Fig. 1 and Fig. 1a taken together constitute a plan view of the forming machine to which this invention relates.

Fig. 2 and Fig. 2a when taken together constitute a side elevation in section of the forming machine shown in Figs. 1 and 1a.

Fig. 9 is a plan view of the toggle lever devices for opening and closing the neck-ring moulds. A neck-ring mould is shown in the closed position.

Fig. 10 is a similar view to Fig. 9 but shows the neck-ring mould in the open position.

Fig. 11 is a sectional elevation taken on line AB of Fig. 9.

Fig. 12 is a plan of a clamping device I employ in connection with the moulds.

Figure 3:
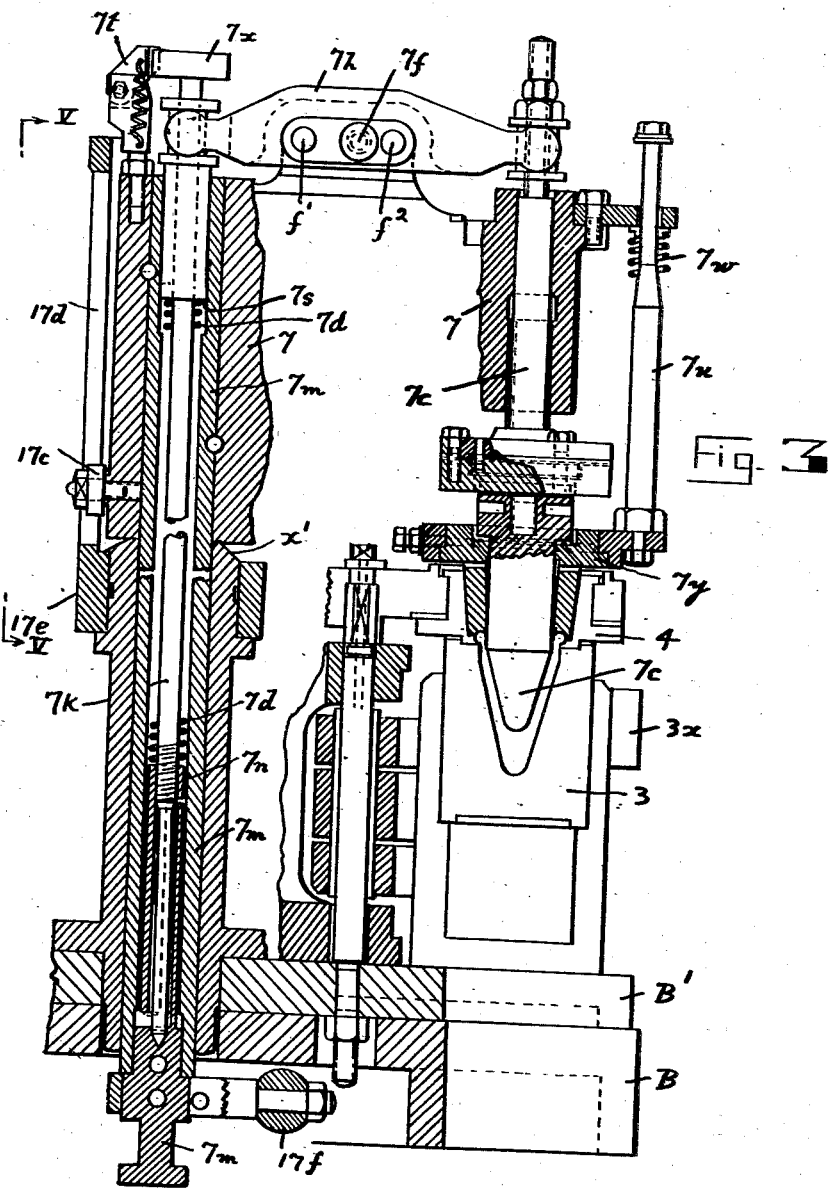
Fig. 3 is a side sectional elevation of one plunger and its pressing member drawn to a larger scale.

In Figs. 1 and 2 the general arrangement of the parts of the machine are shown. The stationary centre pillar C is fixed to the base member D and the stationary cams $a^1$, $b^1$, $c^1$ and $d^1$ are fixed to said pillar C. The continuously rotating table B is driven through the worm wheel 2 and rotates around the pillar C on bearings $a^2$ and $a^3$ and said table B carries the moulds (six being shown in the drawings) to bring them successively beneath a feeding device connected with the furnace which is located at the point A (Fig. 3) but is not shown.

The actions of each head of the machine are successively the same and I will therefore describe the actions of one head commencing at the feeding point A from which it moves in the direction of the arrow Fig. 1.

At this point the cams upon the stationary column C have placed in position vertically above one another and beneath the feeder, the blank or parison mould 3 (which is in two parts), the neck-ring mould 4 (which is also in two parts) and the guide funnel or gob-pot 5. The finishing mould 6 has at this time been swung upon its pivot 6a and is beyond the edge of the table in a closed position. The pressing head 7 has also been swung away from the feeding position.

At this point the head being considered receives a charge of glass which is guided by the gob-pot to enter the moulds 3 and 4 and as it moves forward in the direction of the arrow the gob-pot 5 is swung outwardly by the bowl or runner 5a at the end of its spring loaded connecting rod 5b drawing towards the centre the arm 5c, thus swinging the gob-pot about its pivot 5d. The pressing head 7 is also turned by the cam 17c and other devices hereinafter described, so that it occupies a position directly over the moulds 3 and 4 as is shown at $A^2$ Fig. 1. At this position the finishing mould 6, which had previously been swung beyond the edge of the table B, will open to discharge the article made by this head on the previous revolution.

As the table continues to rotate the pressing head 7 is lowered vertically and the pressing is carried out, after which the said head 7 is raised and turned away and the parison mould is opened leaving the parison suspended by the neck-ring mould. The parts then occupy the positions shown at A³.

At this position the finishing mould which is open is approaching the parison of glass and at A⁴ said mould will close around the parison and the blowing cycle will thereupon be commenced.

The blowing of each parison within a finishing mould is carried out with the neck ring 4 in alignment with the finishing mould and in place on the parison. A blow head 50 is associated with each finishing mould 6 and is carried by the support for that mould. As the pressing head 7 moves away from the corresponding parison mould 4 and the sections of that mould open, the finishing mould swings inwardly around the pivot or fulcrum pin 6a and its separate sections close around the parison which is suspended from the neck mould. The blow head then moves to position and engages the upper surface of the neck ring 4.

The specific structural details of the blow head assembly form no part of the present invention, but the blow head 50 is illustrated as actuated by a piston 51 through the agency of a rod 52 and the piston is shown located within a cylinder 53, which is secured to the swing support on which the finishing mould 6 is mounted. Motivating air for the piston cylinder assembly 52—53 is delivered by the usual means and blowing air is delivered to the blow head in any suitable manner.

At A⁵ said blowing will be continuing and at A⁶ the finishing mould 6 is commencing to be turned about its pivot 6a and the article which has been released from the neck-ring mould is carried by the finishing mould 6 to occupy a position beyond the edge of the table. The parison mould 3 and the neck-ring mould 4 move into position by closing, and the gob-pot 5 is turned into position so that when the position A is again reached the parts have been readjusted to receive another charge of glass.

Thus it will be observed that the glass received in the neck-ring mould 4 at A is held by said neck-ring mould until it reaches approximately the point A⁶ and the said glass is thus not moved from the circle upon which it is received until the glass has been formed into the finished article.

Figure 4:
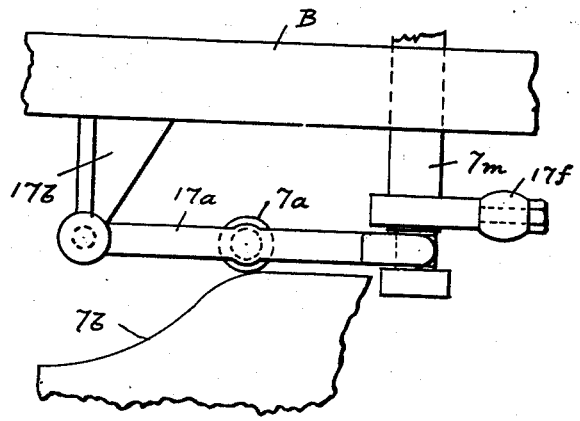
Fig. 4 is an elevation showing the means employed for raising and lowering the pressing heads.

The pressing means I employ are shown in Fig. 3 and comprise a relatively heavy head member 7 which is lifted by a runner 7a (Figs. 2 and 4) passing over a stationary cam 7b adjustably fixed upon the base member of the machine. The head member descends by gravity and as it descends it carries a plunger 7c to press upon the glass within the neck-ring mould 4 and the parison mould 3, while the pressing actions of said plunger are particularly controlled by an adjustable lever 7h, the other end of which is acted upon by an adjustable spring 7d carried by the shaft 7k and located between the adjustable nut 7n and a shoulder 7s on sleeve 7k' which slidably engages the shaft 7k and is pivotally connected to the lever 7h as shown in Fig. 3. The adjustable lever 7h is pivoted at 7f to the upper end of the pressing head 7 and said pivot may be moved to the openings f¹ or f² when it is desired to vary the leverage of the lever 7h. As stated, one end of the said lever 7h is arranged to span a portion at the upper end of the plunger 7c so as to move same in both directions, while the other end of said lever is connected to a shaft 7k which passes loosely within an opening in the shaft 7m upon which the head 7 is fixed.

The inner shaft 7k is encircled by the spring 7d, the lower end of which rests upon a nut 7n within the opening in the larger shaft 7m, and the upper end of which contacts with a shoulder 7s on the sleeve 7k'. The milled disc 7x is held against rotation by a member 7t which can be moved clear of same when said disc is to be rotated.

Rotation of said disc 7x rotates the shaft 7k and causes the nut 7n (which is held against rotation as stated) to move over the shaft 7k and so vary the pressure of the spring 7d.

When the head member 7 descends it reaches a position where it is arrested by a stop piece x' and the plunger plate 7y is then in position on the neck-ring mould. At this time, the plunger 7c will have entered the moulds and the pressing of the glass will be brought about wholly by the pressure of the spring 7d, and therefore said spring only requires to be extended and compressed a small amount, as the whole head member moves the greater amount.

As stated the raising of the head member 7 is carried out by a runner 7a contacting with a cam 7b and these runners 7a (one for each head) are mounted upon levers 17a pivoted to a bracket 17b extending from the under surface of the table B. The other end of the lever 17a is forked to take over a reduced portion of the shaft 7m. The guiding of the pressing heads in their vertical paths while being raised and lowered is effected by a bowl or runner 17c mounted upon the member 7 engaging a slot 17d in the fixed bearing 17e. The said guiding slot 17d extends at its upper end 17x in a horizontal direction so that when the head 7 is fully raised suitable spring devices not shown will return the same so that the runner 17c will pass along the horizontal portion 17x. By these means the cam track 7b which raises the heads may be of reduced length as the horizontal parts of the slots will retain the heads in their raised positions.

Figure 6:
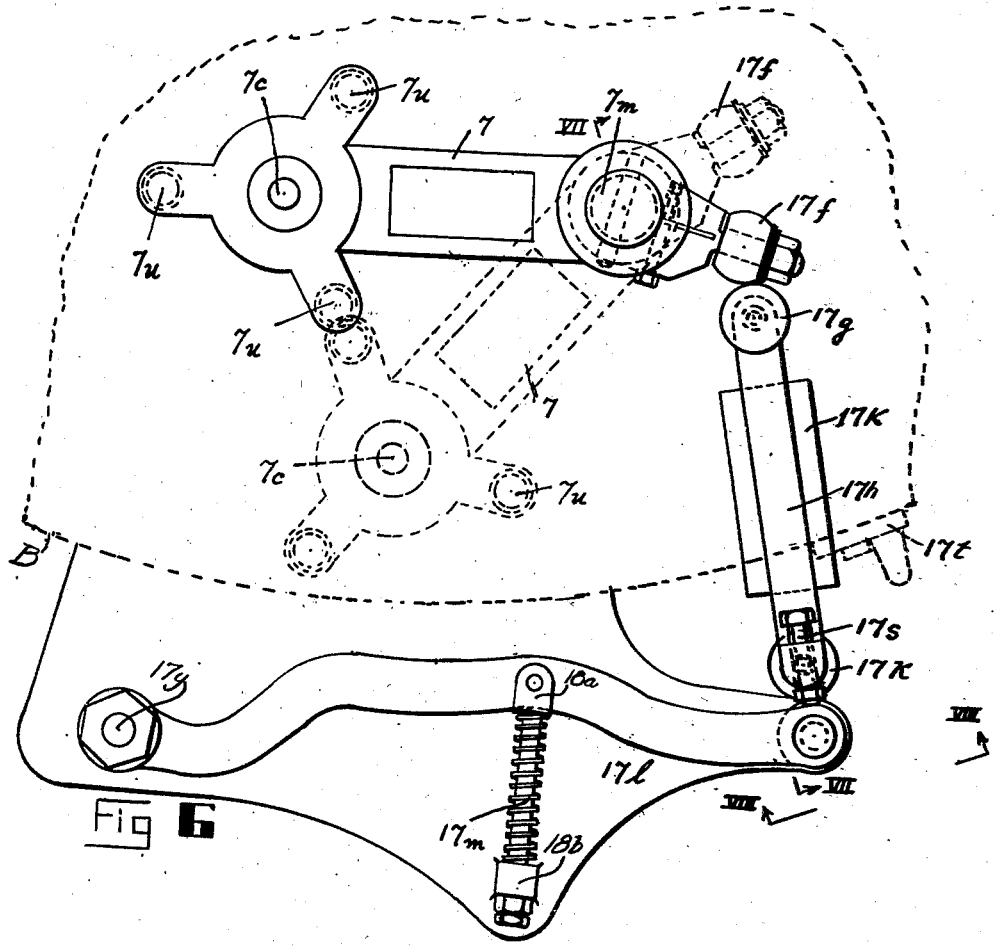
Fig. 6 is a plan of a portion of Fig. 1 drawn to an enlarged scale and shows the means for turning the pressing heads.
Figure 7:
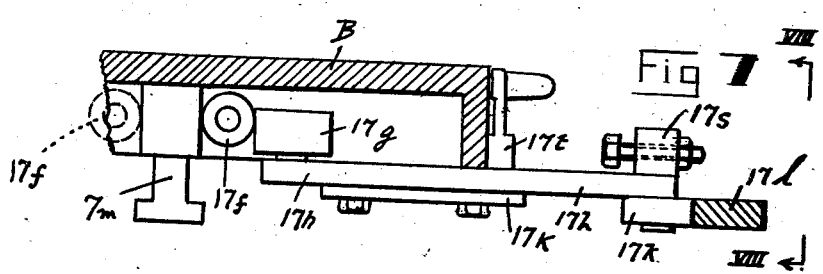
Fig. 7 is a view partially in section taken along the line VII—VII of Fig. 6.
Figure 8:
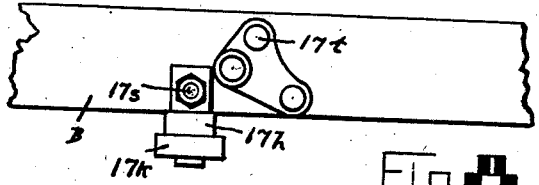
Fig. 8 is an end view of the parts shown by Fig. 7.

When said heads 7 are in their highest positions stated a spherical bowl 17f (Figs. 6 and 7) which is fixed to the lower end of the shaft 7m is arranged to be in alignment with a bowl 17g mounted at the end of a sliding member 17h which extends beyond the edge of the table B to have another bowl 17k at its other end. This bowl 17k is in alignment with a normally stationary cam lever 17l which is pivoted at 17y to a bracket carried by the base member of the machine, so that when said bowl 17k contacts with said cam lever 17l the member 17h is slid inwardly towards the centre of the machine so that the bowl 17g will move the spherical bowl 17f from the position shown in full lines Fig. 6 to that shown in broken lines in the same figure. The turning of the head member 7 thus brings the bowl 17c (hereinbefore described) into the vertical slot 17d so that a cam 7b may allow the head to descend by gravity. The lever 17l is spring loaded by means of spring 17m which surrounds a clevis bolt 18a pivotally secured to the lever. The bolt 18a extends loosely through an apertured lug 18b and constitutes a guide for the spring 17m which abuts against the lug 18b. On the outer end of the member 17h I mount an adjustable stop 17s and upon the edge of the table I pivot a lever 17t which when turned into the position shown by Fig. 7 will prevent the slide 17h from being fully moved and the shaft 7m will not be turned sufficiently for the runner 17c to descend the slot 17d. By this adjustment of the levers 17t one or more heads can be prevented from turning and therefore pressing will not take place by those heads. The spring 17m will allow the lever 17l to move in these circumstances.

As the relative positions of the turning of the head members and the raising and lowering of same must always be the same I arrange the two cams 17l and 7b which perform these operations to be mounted upon the same base and make said base adjustable as a unit around the base member of the machine. By these means the times at which the plunger is raised and lowered and the length of time the plunger is in contact with the glass can be varied.

When the head member 7 descends it is, as described, arrested by stop piece $x^1$ and in order that the plunger plate 7y will have a pressure upon the neck-ring mould 4 I mount said plate upon a cage member 7u which is loaded by springs 7w between its limits of movement.

The locking of the halves of the neck-ring moulds and the finishing moulds in their closed positions I carry out by devices hereinafter explained, while in connection with the parison moulds 3 I provide clamps 20 (Fig. 12) pivoted at 20c to the plate $B^1$ and operated by the cam $d^1$ through a connecting rod 20d. The jaws of said clamp are arranged to have rollers 20a and 20b to take against the outer surfaces of extensions 3x, one from each half of the carrier of the parison mould 3. The outer surfaces of the extensions 3x are tapered so that the advancing of the rollers 20a and 20b over same will force together and lock the halves of the mould 3, and I have found that by making use of the rollers as described a greater angle of taper may be used without the clamping jaws becoming wedged upon the extensions 3x.

The devices (Figs. 9, 10 and 11) for opening, closing and clamping the neck-ring moulds 4 comprise a slide 4d which is moved radially by a cam on the centre column C and having horizontal cross members 4e and 4f connected thereto by spring loaded rods 4x and 4y, and said cross members have a space between them and in which three bowls or runners 4h, 4g and 4k are mounted. Extensions 4l and 4m form the halves of the neck-ring mould carriers and pass one on each side of the centre bowl 4g to be pivoted upon the vertical pin 4j carried by the plate $B^1$. The inner portions $l^1$ and $m^1$ of the extensions 4l and 4m have cam surfaces formed upon them so that as the cross members 4e and 4f are moved towards the centre of the machine the bowl 4g will cause the halves of the mould to open. When the members 4e and 4f are moved outwardly the bowls 4h and 4k act upon the outer surfaces $l^2$ and $m^2$ of the projections and force the halves of the mould together, and by the said bowls reaching the surfaces $l^3$ and $m^3$, which are tapered, the moulds are locked together.

Figure 13:
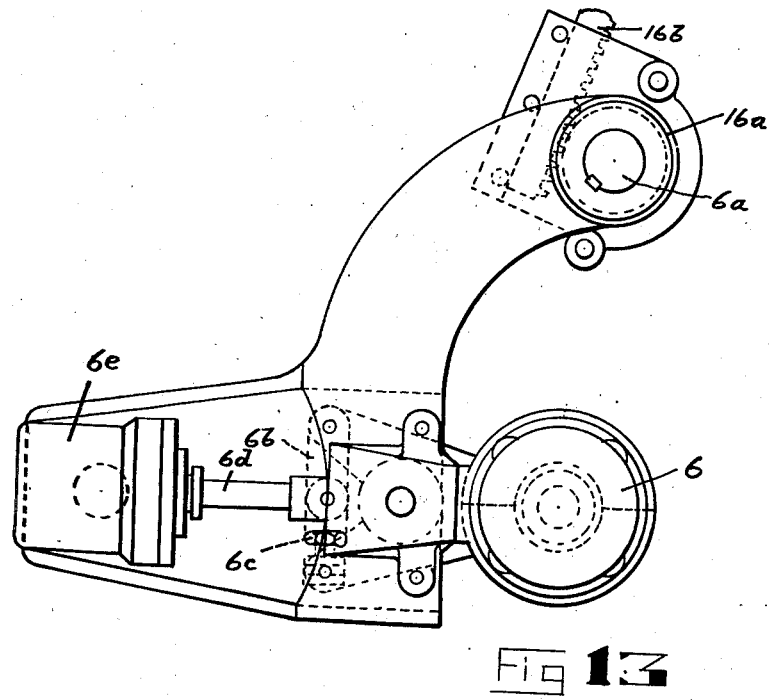
Fig. 13 is a plan of the finishing mould and its operating and locking members.
Figure 5:
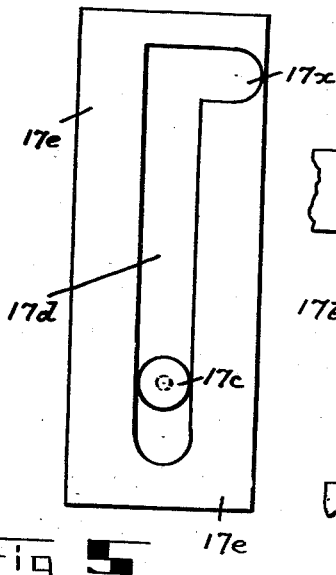
Fig. 5 is an elevation of a support and guiding member for the pressing head.

The finishing moulds 6 I open, close and lock by toggle levers 6b and 6c (Fig. 13) and I arrange the arm 6c to be adjustable. The opening and closing of these moulds is effected by a piston rod 6d which is connected thereto, its piston being moved in both directions within the cylinder 6e by compressed air which is conducted thereto by the flexible tubes. The turning of the finishing moulds is carried out by the shaft 6a having fixed to it a pin 16a which is rotated by a rack 16b the other end of which has a bowl in contact with an adjustable stationary cam on the centre column. Such being the nature and object of my said invention, what I claim is:

1. In combination in a glass-forming machine, a rotatable table, means for continuously rotating said table, a sectional neck-ring mold, a sectional parison mold, a sectional finishing mold all carried by said table, means for opening and closing the sections of said neck-ring mold and for locking such sections in closed position, means for opening and closing the sections of said finishing mold and for locking such sections in closed position, means for opening and closing the sections of said parison mold, means for locking the sections of said parison mold in closed position, said neck-ring and said parison molds being so arranged with relation to said table that the sections of said neck-ring mold when closed move with said table at a constant radius from the axis of rotation of the table and the sections of said parison mold close in alignment therewith, mechanism for actuating the operating means of the sections of said parison mold and the operating means of the sections of said finishing mold to successively move such sections into closed positions in alignment with said neck-ring mold while the neck ring is moving with said table at a constant radius from the axis of rotation of said table, and for actuating said parison locking means to lock the section of said parison mold closed, mechanisms for swinging said finishing mold to and from alignment with the closed sections of said neck-ring mold and mechanisms for actuating said neck-ring-mold-actuating means to open the sections of said neck-ring mold while the sections of the finishing mold are closed and in alignment therewith and to close the sections of said neck-ring mold as said finishing mold is moved away from the position of alignment therewith.

2. The combination in a glass-forming machine, a rotatable table, means for rotating said table, a plurality of ware-forming assemblies carried by said table, each such assembly including a sectional neck-ring mold, a sectional parison mold, a sectional finishing mold, means for opening and closing the sections of the neck-ring mold, means for opening and closing the sections of the parison mold, and means for opening and closing the sections of the finishing mold, said neck-ring mold and said parison mold being so located with relation to such table that they are always in alignment when closed, means carried by the table for moving the finishing mold into and out of a position of alignment with the closed neck-ring mold, means for locking the sections of said parison mold in a closed position and mechanisms for actuating the aforementioned means constituting a part of each such assembly, to close the sections of the neck-ring mold and parison mold and to lock the sections of the parison mold closed while said finishing mold is moving out of the position of alignment with said neck-ring mold, to open said parison mold while said finishing mold is moving into the position of alignment with the closed neck-ring mold to then open the neck-ring mold and to move the finishing mold out of alignment therewith and to then open the sections of said finishing mold.

3. In combination in a glass forming machine, a rotatable table, means for continuously rotating said table, a cooperating neck ring, parison mold, finishing mold and pressing head carried by said table, separate means carried by said table for opening and closing said neck ring and parison mold and so located on said table that said neck ring and parison mold are in alignment when closed, means carried by said table for opening and closing said finishing mold, means for swinging said finishing mold into and out of a position of alignment with said neck ring, means for swinging said pressing head into and out of alignment with said neck ring, means for actuating said pressing head to press a charge of glass contained within said neck ring and parison mold and mechanisms for actuating all said previously mentioned means to close said neck ring and parison mold while said finishing mold is swinging away from the position of alignment with said neck ring, to then swing said pressing head into the position of alignment with said neck ring, to then open said finishing mold, to then actuate the pressing head to press a charge of glass in said neck ring and parison mold, to then open said parison mold and swing said finishing mold to the position of alignment with said neck ring while said pressing head is moving away from the position of alignment with said pressing head, to then close said finishing mold in alignment with said neck ring, to then open said neck ring and to then swing the finishing molds while closed away from the position of alignment with said neck ring.

4. In combination in a glass forming machine, a rotatable table, means for continuously rotating said table, cooperating molds carried by said table comprising a sectional neck ring mold, a sectional parison mold and a sectional finishing mold, means for actuating the sections of said neck ring mold to open and close the same and hold it in a fixed position on said table when closed, means for actuating the sections of said parison mold to open and close the same and to hold said parison mold in a fixed position on said table and in alignment with said neck ring mold when closed, means for actuating the sections of said finishing mold to open and close the same, means for moving said finishing mold to and away from a position of alignment with said neck ring mold, and mechanisms for actuating all said means whereby the neck ring mold cooperates with both the parison mold and the finishing mold in the forming of a glass article, the neck mold starts to open while the finishing mold is in alignment therewith and then starts to close as the finishing mold moves away from the position of alignment and the glass-article-forming cycle of the neck ring and the parison molds overlaps that of the finishing mold and the finishing mold opens and completes its cycle by delivering one article after the cooperating neck ring mold and parison mold initiate the next succeeding article-forming operation.

5. In combination in a glass-forming machine, a rotatable table, means for continuously rotating the same, a plurality of glass-article forming assemblies carried by said table, each such assembly including a sectional neck-ring mold, means for opening and closing the sections thereof and locking such sections in closed position, a sectional parison mold, means for opening and closing the sections thereof and separate means for locking such sections in closed position, a sectional finishing mold, means for opening and closing such sections and means for swinging the finishing mold to and from a position of alignment with said neck-ring mold, the sections of the parison mold and the neck-ring mold being so arranged with relation to said table that the neck-ring and parison molds are in alignment when closed and constitute a charge-receiving receptacle, and mechanisms for actuating all said means to cause said parison mold and finishing mold to alternately cooperate with said neck-ring mold in the operation of forming a glass article, while said neck ring is moving with said table at a constant radius from the axis of rotation thereof, to open said neck-ring mold while the finishing mold is in alignment therewith, to thereupon swing said finishing mold from the position of alignment with said neck-ring mold and to thereupon close said parison and neck-ring molds.

6. In combination in a glass-forming machine, a stationary base, a table rotatably mounted on said base, glass article-forming assemblies mounted on said table and each including a neck ring mold, a parison mold, a finishing mold, a pressing plunger and a pressing head carrying said plunger, means for aligning said neck ring mold and said parison mold, means for swinging said head to and from a position in which said plunger is aligned with said aligned molds, means for swinging said finishing mold to and from a position of alignment with said neck ring mold, a cam carried by the base of said machine for controlling the pressing movement of the pressing head of all said assemblies, a cam yieldingly mounted on said base for controlling the swinging movement of the heads of all said assemblies, and a separate turning mechanism for swinging the finishing mold of each assembly to and from the position of alignment.

7. In a glass-forming machine, a stationary base, a table rotatably mounted on said base, a plurality of glass article-forming assemblies mounted on said table, each such assembly including a pressing head mounted to swing laterally to and from an operating position and to reciprocate vertically, a cam mounted on said base for controlling the reciprocating movement of the pressure heads of all said assemblies, a cam yieldingly carried by said base for controlling the swinging movement of the heads of all said assemblies, and means associated with each such head adjustable to limit the effectiveness of said last mentioned cam with relation to the associated head.

8. In a glass-forming machine, a stationary base, a table rotatably mounted on said base, a plurality of glass-ware-forming assemblies mounted on said table and each including cooperating glass-forming molds and a pressing head, a pressing plunger carried by each such head and yieldingly positioned with relation thereto, cams carried by the base of the machine for controlling the operation of all said heads, and a separate adjustable means for positioning the plunger on each such head.

9. In a glass-forming machine, a stationary base, a table rotatably mounted on said base, a plurality of glass-article-forming assemblies mounted on said table, each including a pressing head mounted to swing laterally to and from an operating position and to reciprocate vertically, a cam mounted on said base for lifting the heads of all said assemblies, means for controlling the movement of said head including a guiding roller carried by said head operating in a motion-limiting slot, and a second cam carried by said base for controlling the position of said roller in said slot.

10. In a glass-forming machine, a stationary base, a table rotatably mounted on said base, a plurality of glass-article-forming assemblies mounted on said table, each including a gravity-actuated pressing head, a pressing plunger movably mounted on said head, a spring for controlling the positioning of said plunger with relation to said head, a cam carried by said base for lifting said pressing head, means carried by said table for holding said head in a raised position and a second cam carried by said base for moving said head to release it from said head-holding means.

11. In a glass-forming machine, a stationary base, a table rotatably mounted on said base, a plurality of glass-article-forming assemblies mounted on said table, each including a gravity-actuated pressing head, a pressing plunger movably mounted on said head, a spring-actuated lever for controlling the movement of said plunger with relation to said head, and a cam carried by said base for raising said head as a preliminary to a pressing operation.

12. In combination in a rotating glass forming machine, a rotatable table, means for rotating said table, cooperating molds carried by said table comprising a sectional neck ring mold, a sectional parison mold and a sectional finishing mold, means for actuating the sections of said neck ring mold to open and close the same and hold said neck ring mold in a fixed position relatively to said table when closed, means for actuating the sections of said parison mold to open and close the same and to hold said parison mold in alignment with said neck ring mold when closed, means for delivering a charge of glass to the aligned molds, means for actuating the sections of the finishing mold to open and close the same, means for moving the finishing mold to and from a position of alignment with said neck ring mold, and mechanisms for actuating all said means, whereby said neck ring mold cooperates with both said parison mold and said finishing mold in the forming of a glass article, the neck-ring mold starts to open while the finishing mold is in alignment therewith and starts to close during the movement of the finishing mold from alignment with the neck-ring mold preparatory to receiving a charge of glass whereby the article-forming cycle of the neck ring and the parison molds overlap that of the cooperating finishing mold and the finishing mold completes its cycle and delivers one article after the cooperating neck-ring mold and the parison mold receive a charge of glass in initiating the next succeeding article-forming operation.

13. In combination in a glass-forming machine, a rotatable table, means for rotating the table, a glass-article-forming assembly carried by the table including a sectional neck-ring mold, means for opening and closing the sections thereof, a sectional parison mold, means for opening and closing the sections thereof, a sectional finishing mold, means for opening and closing the sections thereof and means for moving said finishing mold to and from a position of alignment with said neck-ring mold, said neck-ring mold and said parison mold being so arranged with relation to said table that the sections of the neck-ring mold when closed move with the table at a constant radius from the axis of rotation of the table and the sections of said parison mold close in alignment therewith, and mechanisms for actuating all said means to cause said parison mold and said finishing mold to alternately close in alignment with said neck-ring mold while said neck-ring mold is moving with said table at a constant radius from the axis of rotation thereof, to cause the neck-ring mold to start to open while said finishing mold is in alignment therewith and to cause the article-forming cycle of the neck-ring mold and parison mold to overlap that of the finishing mold whereby the finishing mold opens to complete its cycle by delivering one article after said neck-ring and parison molds have initiated the formation of the next succeeding article.

WILLIAM BELL MITCHELL.